April 15, 1947.　　　J. R. SILVER　　　2,418,956
LOCATING AND DRILLING FIXTURE
Filed June 7, 1944
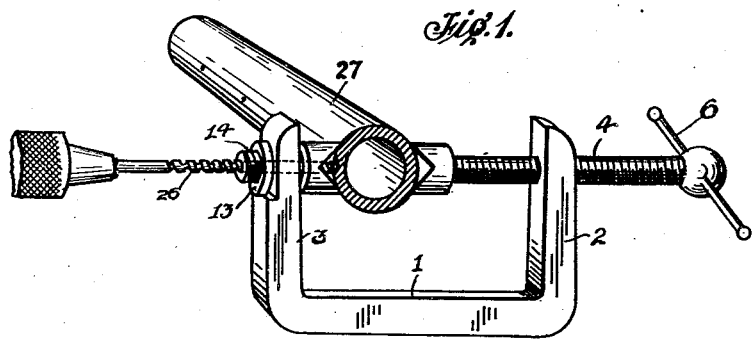
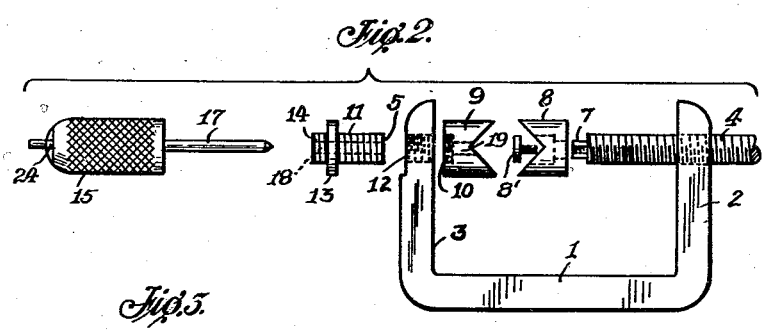
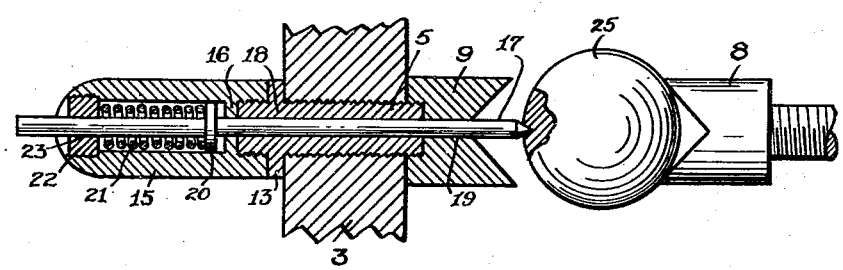
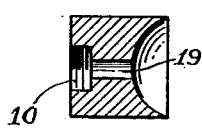 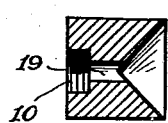 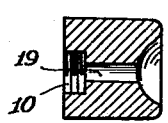
INVENTOR
JOSEPH R. SILVER
BY Hawgood & Van Horn
His ATTORNEYS Patented Apr. 15, 1947

2,418,956

UNITED STATES PATENT OFFICE 2,418,956

LOCATING AND DRILLING FIXTURE

Joseph R. Silver, Minneapolis, Minn., assignor of one-half to Louis D. Freiberg, Akron, Ohio Application June 7, 1944, Serial No. 539,147

2 Claims. (Cl. 77—62)

This invention relates to center locating and drilling fixtures.

In the drilling of holes in certain types of work it has been customary to employ jigs for holding the work during the drilling operation or to provide means as a part of the drill for guiding and steadying the drill. With the latter type of guiding and steadying means, the availability of the drill for other uses of other types of work is more or less sacrificed.

It is, therefore, an object of my invention to provide a center locating and drilling fixture which not only acts as a support to hold the work, but which is provided with means for guiding and steadying the drill in drilling the work.

Another object of the invention is to provide a fixture by which a piece of work may be quickly and easily clamped in a position for accurate drilling, at the same time providing a supporting means for the drill bit during the drilling operation.

A further object of the invention consists in providing a fixture for holding a work piece marked to be drilled, so that the piece may be located or centered properly in this fixture and then be accurately drilled without removing the work from its support.

A further object of the invention consists in a device of the above named character which may be provided with interchangeable work clamping or holding members having their opposed gripping faces formed in various contours which may be used selectively to receive and grip work pieces of various contours.

A still further object of the invention consists in providing a center locating and drilling fixture of the above named character which is extremely simple in construction, inexpensive to manufacture and accurate in use.

Other objects and advantages of my invention will become more apparent as the following description of an embodiment thereof progresses, reference being made to the accompanying drawing in which like reference characters are employed to designate like parts throughout the same.

In the drawing:

Figure 1 is a perspective view of a device embodying my invention and shows a center marked work piece clamped in position to be drilled. This view shows the invention in use during the drilling operation;

Figure 2 is an exploded side elevation of the form of my invention shown in Figure 1;

Figure 3 is a slightly enlarged view of the device, partly in longitudinal section, and shows the manner in which the center locating attachment may be used in connection therewith;

Figure 4 is a vertical section through one form of clamping block which is provided with a concave curved surface for use in holding round or spherical work pieces;

Fig. 5 illustrates in section another type of clamping block having a conical gripping inner surface; and, Figure 6 is still another form of gripping block having a concave-convex gripping surface. Still another type of gripping block is illustrated in Figures 1, 2 and 3, in which the clamping blocks are shown as having V-shaped gripping surfaces, more commonly known as the V-block.

In carrying out my invention, I have provided in the embodiment shown in the accompanying drawing, a U-shaped support 1, the vertical arms 2 and 3 being tapped to receive the screw 4 and the bushing 5 respectively.

The tapped openings are, of course, in axial alignment with each other. The screw 4 is provided at one end with a hand grip 6 and at its inner end with an internally threaded extension 7, upon which is swivelly secured one of the clamping and gripping blocks 8. The block 8 is thus adjustable toward and away from the work which is gripped between it and a similar gripping block 9, which is internally threaded at 10, so that the same may be removably secured on the threaded portion 11 of the bushing 5. The bushing 5 is threaded into a similarly threaded opening 12 in the arm 3 of the support and is limited in its inward movement by a flange or collar 13 which, when the bushing is in place, abuts the outer surface of the arm 3 as indicated in Figure 3.

A threaded extension 14 is formed on the outer end of the bushing 5 to receive the hollow body 15 of the center locating attachment. The body 15 is provided with an internally formed abutment or flange 16 which not only acts as a guide for the center locating pin 17 projecting therethrough, but acts as a stop for the pin, limiting its movement toward the work piece. The locating member comprises a pointed shaft or pin 17 operating through the aligned openings 18 and 19 of the bushing and attached block respectively, and is provided with a shoulder 20 for limiting the inward movement of the pin and for engaging one end of a compression spring 21 housed within the body 15. The bore or opening 19 in the block permits snug sliding movement of the pin 17 therein and guides the same during such movement. A removable nut 22 is threaded into the outer end of the body 15 and engages the opposite end of the spring 21, as shown in Figure 3, while the outer end of the pin 17 operates in the bore of the nut 22 at 23. In order to facilitate removal of the nut, a slot 24 is provided for engagement by a screw driver or other similar tool.

As illustrated in Figure 2, the device is extremely simple of construction and may be readily assembled and disassembled in the support 1. In assembling the device the bushing is first threaded into the opening 12 of the arm 3 until the flange 13 abuts the outer face thereof as shown in Figures 1 and 3.

A gripping or holding block 9 having a work gripping contour suitable for the particular shape of the work piece is then threaded on to the end of the bushing protruding beyond the inner face of the arm 3. A similar gripping or holding block 8 is swively mounted upon the inner end of the screw 4 by means of a set screw 8' and the device is then ready to receive the work piece 25. By turning the screw 4 sufficiently in one direction, the work may be rigidly clamped between the blocks 8 and 9 in position to be drilled.

In order to properly locate the marked work piece in the holder it is only necessary to insert the center locating pin and body assembly through the bushing 5 as shown in Figure 3, so that the pointed end of the pin engages the mark or center previously made on the work piece before it is finally clamped in the blocks. Then the screw 4 is turned to move the block 8 and the work piece into clamping engagement with the cooperating block 9, using the pin 17 as a guiding means to prevent displacement of the work piece as it is being clamped in place.

After the work piece has been centered or located and clamped in the holder, the locator pin assembly is removed from the bushing and a drill 26 of proper size is inserted to engage the center mark on the work in preparation for the drilling operation.

It will be noted that, by virtue of the elongated removable bushing 5 and the aligned openings 18 and 19 in the bushing 5 and block 9 respectively, adequate radial support is provided for the drill 26 during the drilling operation. This will prevent breakage of the drill and will insure extreme accuracy in drilling the work. It will also be understood that, since the blocks 8 and 9 are in alignment and are provided with opposed identical contours, the work piece, when gripped by these blocks, will be centered accurately therein.

Referring to Figures 4 to 6, inclusive, it will be seen that clamping blocks of different contours can be interchanged with those of the V-block type illustrated in Figures 1 to 3, inclusive. This is a conventional way of handling stock of different contours. For example, a pair of opposed clamping blocks having the gripping contour shown in Figure 4 are particularly suitable for firmly holding a work piece of spherical shape. The type shown in Figures 5 and 6 may be employed in connection with work pieces of polygonal or variously curved surfaces, respectively. The block in Fig. 6 may also be used for flat work.

The V-blocks 8 and 9 will readily accommodate round or rectangular tube or bar stock so that the surface to be drilled is always normal to the axis of the drill. When a series of holes are to be drilled in a piece of center marked tube stock as shown at 27 in Figure 1, this may quickly and accurately be done with the aid of my invention, insuring drill holes whose axes are normal to the axis of the tube.

If desired, the center locating pin assembly may be used as a center punch on an unmarked work piece simply by clamping the piece between the blocks as explained hereinbefore and then, by imparting an impact blow to the outer end of the pin 17, causing the pointed end of the pin to center mark the work. The drilling operation may then be carried out as has been explained.

Of course, it will be understood that the bores of the bushing 5 and the block 9 should be of a size to properly accommodate the center locating pin or the drill without substantial lateral movement in these members. Thus, where it is desired to drill a hole of greater diameter than that of the bores of these members, as shown, a bushing and block, having a bore of proper diameter may be interchanged for those shown.

In drilling extremely large holes, that is, of a diameter precluding the direct use of the bushing as shown, a pilot hole is first drilled in the work piece in the regular way with the bushing in place. Then a drill of desired size may be used to enlarge the pilot hole to the selected diameter.

Various changes may be made in the details of construction without departing from the spirit of the invention or the scope of the appended claims.

I claim:

1. A jig or fixture for holding a piece on which a working operation is to be performed, said fixture comprising a support, a clamping member on the support, a removable bushing carried by the support and having a bore for accommodating a tool, a clamping member on the bushing in alignment with said first clamping member and having a bore aligned with the bushing bore, a center locating and punching means associated with said bushing and engageable with the workpiece as it is clamped in the clamping members, said center locating and punching means comprising a body removably secured to one end of said bushing and in axial alignment therewith, and a center locating and punching pin normally projecting through said bushing and second clamping member for engagement with the workpiece but retractable in the body as the workpiece is clamped in the support.

2. A jig or fixture for holding a piece on which a working operation is to be performed, said fixture comprising a support, aligned gripping or clamping members relatively adjustable on the support, a tool guiding bushing carried by the support in axial alignment with said clamping members, an axially aligned center locating and/or punch marking means detachably carried by the outer end of said bushing and having a portion adapted to project through said bushing and one of said clamping members, the center locating and/or punch marking means comprising a hollow body, a center pin axially movable and guided in said body, and a compression spring in the body for exerting a force along the pin to normally project said pin through the bushing and said one clamping member into engagement with a workpiece clamped between the clamping members, said body, pin and compression spring being detachable as a unit from the bushing to permit the insertion of a tool such as a drill through said bushing and into contact with the workpiece to perform a working operation thereon.

JOSEPH R. SILVER.

REFERENCES CITED

The following references are of record in the file of this patent:

UNITED STATES PATENTS

| Number | Name | Date |
|---|---|---|
| 361,021 | Mueller | Apr. 12, 1887 |
| 550,767 | Thielscher | Dec. 3, 1895 |
| 804,795 | Cummings | Nov. 14, 1905 |
| 1,189,667 | Costello | July 4, 1916 |
| 1,544,107 | Sharples | June 30, 1925 |
| 1,792,506 | Paulins | Feb. 17, 1931 |
| 2,242,792 | Panzer | May 30, 1941 |
| 2,351,243 | Vetter | June 13, 1944 |
| 2,384,071 | Boyer | Sept. 4, 1945 |

FOREIGN PATENTS

| Number | Country | Date |
|---|---|---|
| 134,286 | British | Oct. 28, 1919 |
| 366,601 | German | Jan. 5, 1923 |